No. 790,906. PATENTED MAY 30, 1905.
A. H. MARKS.
TUBULAR FLEXIBLE ARTICLE.
APPLICATION FILED SEPT. 9, 1904.

Witnesses
C. H. Walker
E. W. Shepard

Inventor
Arthur H. Marks
by James W. Bevans
Attorney

No. 790,906.                                             Patented May 30, 1905.

UNITED STATES PATENT OFFICE.

ARTHUR HUDSON MARKS, OF AKRON, OHIO.

TUBULAR FLEXIBLE ARTICLE.

SPECIFICATION forming part of Letters Patent No. 790,906, dated May 30, 1905.

Application filed September 9, 1904. Serial No. 223,846.

*To all whom it may concern:*

Be it known that I, ARTHUR HUDSON MARKS, a citizen of the United States, residing at Akron, in the county of Summit and State of Ohio, have invented new and useful Improvements in Tubular Flexible Articles, of which the following is a specification.

This invention relates to tubular flexible articles designed to withstand internal pressure, such as pneumatic tires, tire-covers, hose, &c.; and the object is to provide a durable tire or other like article.

With the above object in view the invention consists in the novel features of construction hereinafter fully described, particularly pointed out in the claims, and clearly illustrated in the accompanying drawings, in which—

Figure 1:
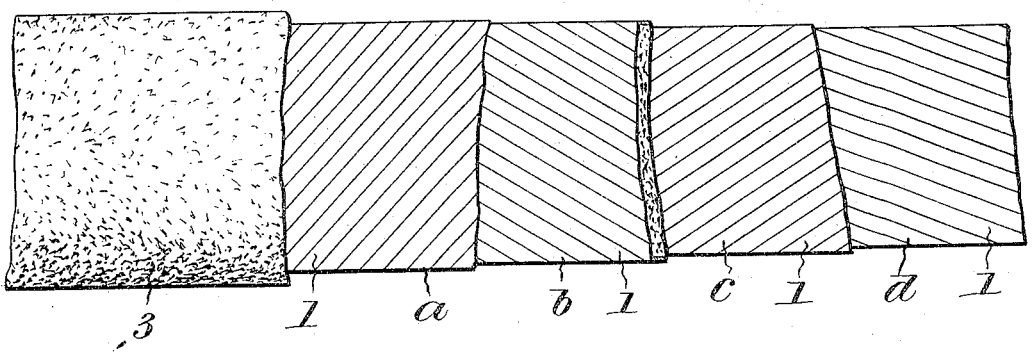
Figure 2:
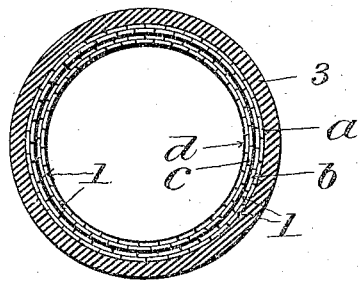
Figure 3:

Figure 1 is a plan view of a tubular flexible structure, a pneumatic tire, constructed in accordance with my invention, the successive layers of which it is formed being shown; Fig. 2, a transverse sectional view, and Fig. 3 a detail view showing the formation of the strips of thread used in the construction thereof.

A pneumatic tire or other tubular flexible article designed to withstand internal pressure as now constructed soon bursts under the pneumatic pressure, and its life is therefore comparatively short. I have made exhaustive tests of the bursting pressure of various tires, using a testing-machine especially constructed for this purpose, and in the course of my experiments have used, first, a tire with a single layer of fabric or reinforcing material, continuing with a series each containing one or more layers of such material than the one preceding it. As a result of these experiments I find that the bursting pressure of a tire as ordinarily constructed rapidly decreases per layer in proportion to the increase of layers. For example, a tire with a single layer of a certain material will burst at three hundred pounds pressure, a tire with a double layer at about five hundred and twenty-five, and with a triple layer at about seven hundred pounds, so that in the three-layer tire the bursting pressure is about two hundred and thirty-four pounds per layer. The cause of this decreasing bursting pressure per layer is due to the fact that the fabric used in the present construction of tires and other tubular flexible articles is uniform throughout, and therefore the elasticity of each layer is the same. The arc, however, of each succeeding layer is slightly greater than its predecessor, with the result that at a maximum pressure the first layer has reached its limit of elasticity, whereas the second layer will stretch slightly more before its limit of elasticity is reached. The third and all succeeding layers, owing to their continually-increasing arcs, have proportionately-increased limits of elasticity, or, in other words, while for a given area all layers of the fabric or other material being uniform the elasticity of each is the same, yet as the result of increased area the stretching capacity of each layer is increased in direct proportion to its increased area. The pneumatic pressure thus acts upon each layer of fabric or reinforcing material separately instead of upon the several layers as a whole. I obviate this difficulty and provide a more durable structure by providing layers of reinforcing material—such as fabric, thread, &c.—having varying degrees of elasticity, the innermost layer having the greatest degree of elasticity and each succeeding layer a smaller degree of elasticity than its predecessor, whereby the pressure will act upon all of said layers instead of upon each layer separately.

The elasticity of the layers may be varied in a number of different ways, the present embodiment of my invention being but one of a number of constructions that may be utilized.

As illustrated, I form the tire or other article in the present instance of strips 1 of rubber-coated threads 2, said strips being placed at an angle to form one ply *a* of the first layer. Upon the first ply *a* of strips 1 a similar ply *b* is formed of strips extended reversely to and crossing the strips of ply *a* at a slightly-increasing angle. Before forming the next layer the first layer may be covered with a thin coating of rubber-gum or slushed with rubber-cement. Strips 1 are then placed upon ply *b* at a slightly-increased angle and extending in a reverse direction to form ply $c$ of the second layer. Ply $d$ of the second layer is formed by strips 1 wrapped in a reverse direction to those of ply $c$ and extended at a slightly-increased angle. As many layers may be used as may be desired, according to the character of the tire or other like article to be constructed. By increasing the angle of crossing of the several plies the elasticity of the plies or layers is varied, the innermost ply or layer having the greatest degree of elasticity and each succeeding layer a smaller degree of elasticity than its predecessor, so that the entire structure will under pressure stretch uniformly. The structure is then covered with an outer covering of rubber-gum 3 and vulcanized.

As stated, I do not limit my invention to tires, as hose and other tubular flexible articles designed to withstand internal pressure may be constructed in the same manner.

I do not claim in the present application the method of constructing the tire or other article herein described, as said method forms the subject-matter of an application filed December 1, 1904, Serial No. 235,121.

Having thus fully described my invention, what I claim as new, and desire to secure by Letters Patent of the United States, is—

1. A tubular flexible article designed to withstand internal pressure formed of a plurality of layers of yielding material, said layers having varying degrees of elasticity and arranged with the layer having the maximum elasticity innermost and each succeeding layer of less elasticity than its predecessor.

2. A pneumatic tire formed of a plurality of layers of yielding material, said layers having varying degrees of elasticity and arranged with the layer having the maximum elasticity innermost, and each succeeding layer of less elasticity than its predecessor.

3. A tire-cover formed of a plurality of layers of yielding material, said layers having varying degrees of elasticity and arranged with the layer having the maximum elasticity innermost, and each succeeding layer of less elasticity than its predecessor.

4. A tubular flexible article designed to withstand internal pressure comprising a plurality of layers of strips formed of threads and rubber, the strips of the different layers being arranged at different angles to form layers of varying degrees of elasticity, the innermost layer having the maximum degree of elasticity and each succeeding layer a smaller degree of elasticity than its predecessor.

5. A pneumatic tire comprising a plurality of layers of strips formed of threads and rubber, the strips of the different layers being arranged at different angles to form layers of varying degrees of elasticity, the innermost layer having the maximum degree of elasticity, and each succeeding layer a smaller degree of elasticity than its predecessor.

6. A tire-cover comprising a plurality of layers of strips formed of threads and rubber, the strips of the different layers being arranged at different angles to form layers of varying degrees of elasticity, the innermost layer having the maximum degree of elasticity, and each succeeding layer a smaller degree of elasticity than its predecessor.

7. A tubular flexible article designed to withstand internal pressure comprising a plurality of strips formed of rubber-coated threads, the strips of the different layers being arranged to form layers of varying degrees of elasticity, the innermost layer having the maximum degree of elasticity, and each succeeding layer a smaller degree of elasticity than its predecessor.

8. A tubular flexible article designed to withstand internal pressure formed of a plurality of reinforcing bands or layers constructed and arranged so that the unit stretch of each layer due to a unit stress, beginning with the innermost layer, is sufficiently greater than the unit stretch of the next succeeding layer under the same unit stress, that all of the layers will be subjected to the same tensile stress under a given internal pressure in the tube.

In testimony whereof I hereunto affix my signature in the presence of two witnesses.

ARTHUR HUDSON MARKS.

Witnesses:
J. H. ADAMS,
C. P. KENNEDY.